United States Patent [19]

Lichte, Jr.

[11] 3,724,086
[45] Apr. 3, 1973

[54] INSTRUMENT MOUNTING

[75] Inventor: Henry P. Lichte, Jr., Houston, Tex.

[73] Assignee: Sperry Sun Well Surveying Company, Sugar Land, Tex.

[22] Filed: Apr. 6, 1970

[21] Appl. No.: 26,044

Related U.S. Application Data

[63] Continuation of Ser. No. 778,491, Nov. 25, 1968, abandoned.

[52] U.S. Cl. ..........................33/304, 33/365, 33/391
[51] Int. Cl. ..............................................G01c 17/02
[58] Field of Search.....33/222, 205.5, 205.5 P, 205.5 E, 33/206, 206.2, 215.1, 215.2

[56] References Cited

UNITED STATES PATENTS

| | | | |
|---|---|---|---|
| 2,364,908 | 12/1944 | Miller | 33/222 |
| 2,357,586 | 9/1944 | Greaves | 33/215 |
| 2,189,560 | 2/1940 | Culbertson | 33/215 |
| 2,873,536 | 2/1959 | Rieger | 33/225 |

Primary Examiner—William D. Martin, Jr.
Attorney—George L. Church, Donald R. Johnson, Wilmer E. McCorquodale and John E. Holder

[57] ABSTRACT

The particular embodiment described herein as illustrative of one form of the invention utilizes, in an instrument for lowering into a wellbore, an indicator device mounted in an inverse position in the instrument for measuring angular parameters of the wellbore, and a camera unit for recording the indicator measurements. The indicator is positioned above the camera in a fluid environment and on a pivotal surface with the indicator face pointing down. In order to permit a high angle of operation of the instrument, the pivotal surface is movable with respect to the indicator so that the pivot does not restrict the movement of the indicator for measurements in wellbores having an inclination up to 90°.

16 Claims, 3 Drawing Figures

PATENTED APR 3 1973　　　3,724,086
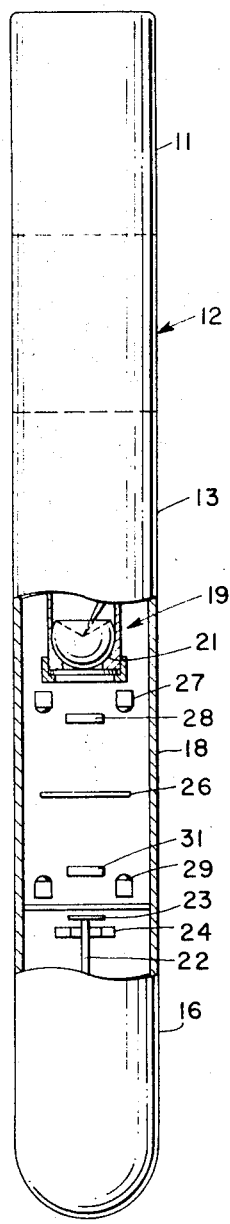
FIG. 1
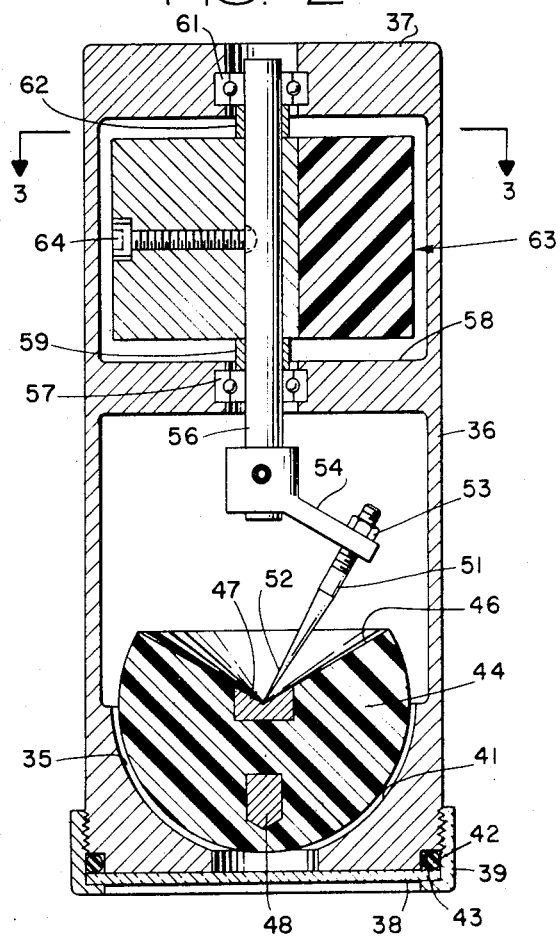
FIG. 2
FIG. 3
INVENTOR
HENRY P. LICHTE, JR.
*John E. Holder*
ATTORNEY

INSTRUMENT MOUNTING

This application is a continuation of application Ser. No. 778,491 entitled Instrument Mounting, filed on Nov. 25, 1968, now abandoned.

BACKGROUND OF THE INVENTION

This invention relates to a mounting for a wellbore instrument, and more particularly to an instrument mounting arranged to permit high angle operations in a wellbore.

Wellbore instruments and tools inherently have design limitations associated with the small diameter environment of the wellbore requiring a small diameter housing of short length to facilitate the movement of such tools in the wellbore which often follows a tortuous path. Therefore, in order to avoid sticking the tool in the wellbore, it is desirable to utilize a short small diameter tool.

In addition, it is desirable to utilize one tool component for more than one function where possible to facilitate size limitations and to minimize construction costs. For example, in an instrument making measurements of more than one wellbore parameter, a device may be utilized for recording all the measurements on one device.

In the drilling of boreholes into the earth, it is often desirable to survey one or more locations in the borehole to determine the angle and direction of the hole. The hole may be cased or uncased and depending upon this factor, it is often necessary to run various types of instruments simultaneously, and to make downhole records of the measurements of such instruments for retrieval to the surface. For example, if it is desirable to measure and record the direction and inclination of a borehole which had been cased with metal pipe, a gyroscopic instrument can be run into the wellbore, together with an inclinometer to measure the desired characteristics of the wellbore. In order to meet the size limitations of such an instrument, it is expedient to use a single camera unit for recording the instrument measurements by mounting one of the instruments at each end of the camera unit.

An apparatus presently used for making such measurements includes a gyroscopic instrument at the lower end of the tool above which is mounted a camera. Above the camera is mounted an inclinometer and directional indicator. The inclinometer is comprised of a rotatable wheel mounted on a movable shaft coaxial with the longitudinal axis of the tool housing. A weighted member on the shaft is aligned with the wheel for maintaining the wheel in a vertical orientation. A weight on the indicator wheel will seek the bottom side of the wellbore. Indicia on the wheel, when photographed, provide a record of the borehole inclination at that instant. In the instrument just described, it is found that at low angles of inclination, the weighted member on the shaft is not sensitive enough to overcome inertia in the device, so that at low angles, the apparatus is ineffective to make accurate readings.

Another conventional inclinometer which is presently being used is so supported by buoyant fluids as to provide for movement of its indicator portion through an arc of 180°, thereby providing reading of 90° of inclination in any direction. However, when this apparatus is inverted, as for example to be used in the instrument described above which records two instrument readings with a single camera, the buoyancy forces of the fluid and arrangement of the support for the floating indicator will not permit free movement of the indicator over a wide arc. Even when operated in an upright position, the floating indicator arrangement is sometimes inaccurate due to sticking of the indicator on the sides of container holding the buoyant fluids.

It is therefore an object of the present invention to provide a new and improved mounting for a wellbore indicator apparatus.

SUMMARY OF THE INVENTION

With these and other objects in view, the present invention includes, in a wellbore instrument, a housing for mounting an instrument for indicating parameters of the wellbore and a recording unit for providing a record of the instrument readings. The instrument indicator face is mounted opposite a recording unit in the tool housing. The indicator is buoyantly mounted within the housing so that it may move through an arc of 180° thereby providing readings in any direction up to 90°. A pivotal member for supporting the buoyant indicator is arranged to move relative to the housing in response to gravity forces so as to provide maximum clearance of parts at all times, and thereby permit such 180° arcuate movement of the indicator within the housing.

A complete understanding of this invention may be had by reference to the following detailed description when read in conjunction with the accompanying drawings illustrating an embodiment thereof.

BRIEF DESCRIPTION OF THE DRAWINGS

FIG. 1 is a schematic view of a wellbore instrument for incorporating principles of the present invention;

FIG. 2 is a cross sectional view of a wellbore instrument embodying a mounting in accordance with the principles of the present invention; and FIG. 3 is a sectional view taken along lines 3—3 of FIG. 2 and showing a weight and float arrangement of the apparatus.

DESCRIPTION OF THE PREFERRED EMBODIMENTS

Referring first to FIG. 1 of the drawings, a schematic view of the well survey instrument includes, at the upper end of the instrument, a power supply section 11 which may be in the form of a battery pack or a power supply circuit receiving the power from a conductor cable extending to the surface. Immediately below the power supply section is a control circuit housing 12 which contains the electrical circuitry for operating the survey apparatus. Below the control circuit housing is an upper instrument section 13 which is separated from a lower instrument section 16 by a camera section 18. The upper instrument section is shown having an inverted inclinometer unit 19 mounted therein with its indicator face 21 with scaler indicia thereon pointing downwardly away from the upper end of the tool. A gyroscopic instrument is mounted in the lower instrument section 16, having a vertical shaft 22 of the gyro instrument extending upwardly from its upper end upon which is mounted a pointer 23. A circular azimuth measuring disc 24 is positioned about the pointer, and when photographed provides a record of the azimuth position of the tool housing.

The camera section 18 which is located between the upper and lower instrument sections includes a photographic film disc 26 which is insertable from the side of the tool through a slot (not shown). Upper and lower lens and lamp units are arranged at the ends of the camera section. Lamps 27 at the upper end of the housing direct light on to the indicator face 21 with the resulting image being reflected through an upper lens 28 on to the top of the film disc 26. At the same time, lamps 29 at the lower end of the camera section provide a light source which is reflected from the measuring disc 24 and pointer 23 in the gyro housing through a lower lens 31 and onto the bottom of the film disc 26. Therefore, when the lamps 27, 29 are energized, images of the upper and lower instrument faces are recorded simultaneously on opposite sides of the film disc 26.

As set forth in the Background Of The Invention, the problems associated with mounting an inclinometer unit within a well tool, particularly the indicator face for high degrees of free movement, form the basis of the present invention. The apparatus set forth in FIGS. 2 and 3 of the drawings is directed towards the present invention. Although the invention is illustrated and described in detail below in its application to an inverted instrument indicator, the principles thereof have application to an upright mounting as well.

Referring now to FIG. 2, the upper instrument section is shown in detail having an inclinometer mounted in an inverted position therein. The instrument includes a housing 36 which is formed from a metal cylinder having an inwardly projecting shoulder portion 37 at its upper end. The lower end of the housing is closed by a glass disc 38, which is sealingly retained over the lower end of the housing by means of a retainer nut 39. A hemisphere shaped retainer 41 is formed in the interior of the lower end of the housing. The retainer is positioned directly above the glass disc. An O-ring seal 42 is positioned in a peripheral groove 43 in the lower end of the retainer 41 to provide a sealing surface between the glass disc 38, the retainer nut 39, and the retainer 41. The instrument indicator is in the form of a ball shaped float 44. A segment 46 is removed from the upper surface of the ball in the form of a V-shaped notch. A hardened insert forms a seat 47 in the segment 46. The ball float 44 is made of a material which is less dense than a fluid for filling the interior of the housing in which the instrument is located. A dense counter weight material 48 is embedded in the lower half of the ball to provide a gravitational force for maintaining the ball indicator in its proper orientation with respect to a horizontal reference surface.

A pivot arm 51 is positioned above the ball indicator with the lower pointed end forming a pivot 52 received in the seat 47 of the upper segmented surface of the indicator. The buoyancy of the fluid within the instrument housing 36 maintains the indicator 44 against the pivot 52 and leaves a space 35 filled with fluid between the indicator face 21 and the hemisphere retainer 41 at the lower end of the housing. Therefore, while the counter weight 48 on the indicator ball maintains the indicator face in a downward direction, the buoyancy of the fluid holds the seat 47 of the indicator ball upwardly against the pivot 52.

The pivot arm 51 is slanted at an angle with respect to the center axis of the tool, and is attached by means of a lock nut 53 at its upper end to a pivot holder 54. The pivot holder is attached to the end of a shaft 56 extending upwardly to the upper end of the instrument housing. An annular shoulder portion 58 extends inwardly from the housing midway between the ends of the housing. A bearing 57 is positioned within the inwardly extending shoulder portion 58 in the center of the housing, and rotatably supports the shaft 56. A bearing 61 which is positioned within the inwardly extending shoulder 37 at the upper end of the housing rotatably supports the upper end of the shaft 56. A spacer 59 is positioned about the shaft just above the bearing 57 and prevents a downward movement of the shaft within the bearing. Likewise, a spacer 62 is positioned about the shaft just below the upper bearing 61. A counter balance member 63 including an eccentric weight member is positioned about the shaft between the two spacers. The counter balance member is attached to the shaft by means of a set screw 64.

A cross section of the counter balance member is shown in FIG. 3, and consists of a lightweight plastic portion 66 and a weighted portion 67 made of some metal, such as brass. The weighted portion of the counter weight member is machined to provide a bore portion 68 for fitting about the shaft. The plastic portion of the counter weight member is attached to the weighted portion by means of screws 69 or the like.

In the operation of the wellbore surveying instrument disclosed above, the upper and lower instrument sections 13 and 16 are assembled within the tool housing and a timer in the electrical circuitry housing 12 is set to operate the instruments when the instruments reach a surveying station within the wellbore. The instrument is then lowered into the wellbore by means of a wire line or conductor cable, or is go-deviled into drill pipe. Once the tool has been located at a surveying station within the wellbore, the timing mechanism within the tool actuates the lamp circuit for initiating a light source within the instrument housing. Light from the lamps 27, 29 impinges upon the respective lower and upper instrument faces and makes a photographic recording upon the film disc 26.

During the operation of the upper instrument unit, for example, if the upper end of the inclinometer housing is tilted to the left, as viewed in FIG. 2, the weighted ball indicator 44 at the bottom of the housing is rotated to the right relative to the housing. During such relative movement, the indicator rotates on pivot 52. Such relative rotation or tilting of the indicator to the right can take place until the indicator is rotated approximately 90°. It is readily seen that if tilting were in the opposite direction with the members of the tool positioned as shown in FIG. 2, the ball indicator would be permitted to rotate only approximately 30° before the right hand surface of the notched portion 46 of the ball indicator would engage the pivot arm 51. However, since the weighted portion 67 of the counter balanced member 63 on the shaft 56 is positioned on the opposite side of the shaft from the pivot arm 51, as the instrument housing tilts to the right and becomes the lower side of the instrument, the weighted portion 67 will tend to drop downwardly to the lower side of the housing, while the light weight plastic portion 66 which is buoyant, tends to buoy upwardly. The resulting forces cause the shaft to rotate and move the pivot arm 51 around the housing to the opposite or upper side thereof. This movement of the pivot arm will permit the ball shaped indicator 44 to rotate approximately 90° in this condition. The interior of the instrument housing is filled with a dense liquid with some space being provided between the liquid level and the upper end of the housing just below the inwardly facing shoulder to permit an expansion of the fluid within the housing due to temperature and pressure changes in the wellbore.

If the invention is applied to an upright mounting of the indicator 44, the same principles of operation apply. However, in such an embodiment the ball, of course, would be on top of the pivot. Therefore, the bottom portion of the ball close to the pointer would be weighted to hold the ball on the pivot with the balancing force tending to move the ball off the pivot being provided by the buoyant fluids. This force arrangement would be just opposite to that shown in FIG. 1. In other respects the apparatus would operate the same.

It is also readily seen that the invention may have application to other wellbore devices, and therefore, while particular embodiments of the present invention have been shown and described, it is apparent that changes and modifications may be made without departing from this invention in its broader aspects.

What is claimed is:

1. Apparatus for indicating inclination of a wellbore comprising: a housing; indicator means movably mounted in said housing; pivot means engaging said indicator means, which pivot means is angularly disposed to the vertical axis of said housing and which restricts movement of said indicator means; and means responsive to changes in attitude of said housing for moving said pivot means to a position which decreases the restriction on the movement of the indicator means.

2. The apparatus of claim 1 including a shaft and wherein the pivot means is attached to said shaft and wherein the pivot moving means is also attached to said shaft.

3. The apparatus of claim 1 including a liquid in said housing and wherein the indicator means is buoyant in said liquid and retained by said pivot means.

4. Apparatus for indicating inclination comprising: a housing indicator means pivotally mounted in said housing; pivot means engaging said indicator means and angularly disposed to the vertical axis of said housing; and means for moving said pivot means relative to said indicator means in response to changes in attitude of the housing.

5. The apparatus of claim 4 including a fluid in said housing and wherein the indicator means is buoyant in said fluid and retained by said pivot means, and wherein the indicator means includes a housing attitude change responsive portion.

6. In a wellbore instrument, the combination of means for movably mounting an indicating element of the instrument in the instrument housing, which means comprises: bearing means on said indicating element; pivot means having a pivot point engaging said bearing means and a pivot arm, said pivot arm being angularly disposed with respect to said indicating means when the housing is in a vertical position; and means responsive to changes in attitude of the housing for moving said pivot arm in a circular path within said housing.

7. The instrument of claim 6 wherein the moving means is rotatably mounted and gravity responsive and wherein the pivot arm is connected to said moving means so that the pivot arm is always on the opposite side of the housing as the gravity responsive portion of the moving means.

8. In an instrument, including a housing, measuring means within said housing, an indicator within the housing for providing an indication of the measurements, means for recording the indications, an improvement for movably mounting the indicator within the housing which comprises: a pivot member for supporting the indicator for movement within the housing; a shaft rotatably positioned along the longitudinal axis of said housing; an arm member extending angularly from said shaft connected to said pivot member; and means responsive to changes in the angular attitude of said housing for moving said pivot member about said shaft.

9. The instrument of claim 8 including a buoyant fluid occupying the housing, wherein the moving means includes a first weight portion connected to said shaft opposite said arm member and a second portion buoyant in said fluid and positioned on said shaft on approximately the same side as said arm member.

10. In an apparatus for measuring the inclination of a wellbore: a housing; means movable within the housing for providing indications of changes in the angular attitude of the housing, said indicator means including an element responsive to changes in the angular attitude of the housing, and said indicating means having a notch portion therein; pivot means engaging the notch portion of said indicating means and angularly disposed with respect to the vertical axis of said housing; and means responsive to changes in the attitude of said housing for moving said pivot means so said pivot means can clear the notch portion of said indicator means.

11. The apparatus of claim 10 wherein said pivot means includes a pivot point and a pivot arm, and further including a fluid in said housing for providing a buoyant force to hold said indicator means in contact with said pivot point.

12. The apparatus of claim 11 wherein said moving means includes a weighted member acting on said pivot arm and movable in response to changes in the attitude of the housing to move said pivot arm.

13. The apparatus of claim 12 wherein said moving means also includes a lightweight portion which is buoyant in the fluid located in the housing, with the resulting buoyant force aiding said weighted member for moving said pivot arm.

14. The apparatus of claim 10 including a buoyant fluid occupying the housing and wherein said indicator is in the form of a lightweight ball having a notch therein forming a seat for said pivot member and a weight opposite said notch for maintaining a predetermined attitude of the ball in said buoyant fluid.

15. In a borehole attitude indicating tool: a housing; an indicating element movable in said housing in response to changes in the attitude of said housing; pivot means movably mounted in said housing and engaging said indicating element, said pivot means having a portion thereof angularly disposed with respect to the longitudinal axis of said housing to permit tilting of said indicating element through an arc having a first maximum degree of tilt relative to a vertical plane when the longitudinal axis of said housing is in a vertical plane; and means responsive to changes in the attitude of said housing for moving said pivot means to a position to permit tilting of said indicating element through an arc having a second maximum degree of tilt relative to a vertical plane which second maximum degree of tilt is greater than said first maximum degree of tilt.

16. Apparatus of claim 15 wherein said pivot means includes a seat on said indicating element and a pivot arm movably mounted in said housing, said seat having portions limiting the arc through which said indicating element is permitted to tilt and said pivot arm being movable to positions for permitting tilt of said indicating element through an arc having said second maximum degree of tilt.

* * * * *